(12) United States Patent
Edwards et al.

(10) Patent No.: US 10,907,341 B2
(45) Date of Patent: Feb. 2, 2021

(54) MAGNETIC STRUT CHANNEL FITTING

(71) Applicant: ABB Schweiz AG, Baden (CH)

(72) Inventors: Daniel P. Edwards, Cordova, TN (US); Shaun M. Brannen, Lakeland, TN (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/230,010

(22) Filed: Dec. 21, 2018

(65) Prior Publication Data
US 2019/0127967 A1 May 2, 2019

Related U.S. Application Data

(63) Continuation of application No. PCT/US2017/037207, filed on Jun. 13, 2017.
(Continued)

(51) Int. Cl.
E04H 12/00 (2006.01)
E04B 1/19 (2006.01)
F16B 7/04 (2006.01)
E04C 3/08 (2006.01)
F16B 1/00 (2006.01)
F16B 7/18 (2006.01)

(52) U.S. Cl.
CPC .............. E04B 1/1903 (2013.01); E04C 3/08 (2013.01); F16B 1/00 (2013.01); F16B 7/0486 (2013.01); F16B 7/185 (2013.01); E04B 2001/1957 (2013.01); F16B 7/187 (2013.01); F16B 2001/0035 (2013.01)

(58) Field of Classification Search
None
See application file for complete search history.

(56) References Cited

U.S. PATENT DOCUMENTS 3,245,165 A * 4/1966 Podoloff ................. F16B 5/065
40/591
3,852,935 A * 12/1974 Jones .................... E04B 2/7457
52/481.1
(Continued)

FOREIGN PATENT DOCUMENTS

| GB | 2430683 | 4/2007 |
|----|---------|--------|
| GB | 2532996 | 6/2016 |
| WO | 2013002560 | 1/2013 |

Primary Examiner — Basil S Katcheves
(74) Attorney, Agent, or Firm — Taft Stettinius & Hollister LLP; J. Bruce Schelkopf

(57) ABSTRACT

A magnetic strut channel fitting includes first and second plates connected to each other and a plurality of magnets embedded into at least one of the first and second plates. According to another embodiment of the present invention, a magnetic strut channel fitting includes a substantially flat plate and a plurality of magnets embedded into the plate. According to yet another embodiment of the present invention, a magnetic strut channel fitting includes a substantially flat connecting plate, first and second arm members, each of the first and second arm members having a vertical plate and a horizontal plate, and a plurality of magnets, the plurality of magnets embedded into the connecting plate to allow the magnetic strut channel fitting to be magnetically adhere to a strut channel. The plurality of magnets allow the magnetic strut channel fitting to be magnetically adhered to a strut channel.

19 Claims, 14 Drawing Sheets

Related U.S. Application Data

(60) Provisional application No. 62/353,875, filed on Jun. 23, 2016.

(56) References Cited

U.S. PATENT DOCUMENTS

| | | | | |
|---|---|---|---|---|
| 4,742,640 | A * | 5/1988 | Moore | A01K 97/06 |
| | | | | 43/57.1 |
| 5,301,822 | A * | 4/1994 | Coleman | B25H 3/04 |
| | | | | 211/70.6 |
| 5,313,754 | A * | 5/1994 | Jensen | E04F 19/02 |
| | | | | 52/232 |
| 5,971,379 | A * | 10/1999 | Leon, Jr. | B25B 11/002 |
| | | | | 228/212 |
| 8,242,343 | B2 * | 8/2012 | Jones | G10D 13/02 |
| | | | | 84/421 |
| 8,955,891 | B2 * | 2/2015 | Millsap | E05C 17/025 |
| | | | | 16/82 |
| 10,010,173 | B1 * | 7/2018 | Ricco | A47B 96/027 |
| 2008/0217506 | A1 | 9/2008 | Cohoon | |
| 2010/0269400 | A1 * | 10/2010 | Gesik | A01K 97/06 |
| | | | | 43/54.1 |
| 2011/0132159 | A1 | 6/2011 | Goodman, Jr. | |
| 2011/0192519 | A1 | 8/2011 | Gangl | |
| 2012/0005868 | A1 | 1/2012 | Suderman | |
| 2014/0033602 | A1 * | 2/2014 | Gesik | A01K 97/06 |
| | | | | 43/57.1 |
| 2015/0176754 | A1 | 6/2015 | Houston | |
| 2015/0369422 | A1 * | 12/2015 | Alcorn | F16M 13/022 |
| | | | | 248/74.1 |
| 2017/0290426 | A1 * | 10/2017 | Hovenden | A47B 91/024 |

* cited by examiner

MAGNETIC STRUT CHANNEL FITTING

CROSS REFERENCE TO RELATED APPLICATIONS

This application claims priority to U.S. Provisional Patent Application No. 62/353,875, filed on Jun. 23, 2016, the contents of which are incorporated herein by reference in its entirety.

FIELD OF THE INVENTION

The present invention relates to strut channel fittings, and more particularly, to magnetic strut channel fittings configured to be magnetically adhered to a strut channel during assembly.

BACKGROUND OF THE INVENTION

Strut channels are generally used for structural supports, such as supporting cables and mechanical/electrical components, during construction of various facilities or buildings. For example, strut channels can be assembled together to make various shelves, racks, and other support structures and assemblies. These strut channels are generally secured together with strut channel fittings. Currently, the strut channel fittings are held in place manually (using hands) during assembly and secured to the strut channels with fasteners such as bolts. Since the strut channel fittings need to be lined up correctly against open ends of the strut channels while tightening bolts through the strut channel fittings, it is often time consuming and difficult to mount the strut channel fittings to join multiple strut channels.

Accordingly, although various strut channel fittings are available currently in the market, further improvements are possible.

SUMMARY OF THE INVENTION

According to an embodiment of the present invention, a magnetic strut channel fitting includes first and second plates, the first and second plates connected to each other, and a plurality of magnets embedded into at least one of the first and second plates, wherein the plurality of magnets allow the magnetic strut channel fitting to be magnetically adhered to a strut channel.

According to another embodiment of the present invention, a magnetic strut channel fitting includes a substantially flat plate and a plurality of magnets embedded into the plate, wherein the plurality of magnets allow the magnetic strut channel fitting to be magnetically adhered to a strut channel.

According to yet another embodiment of the present invention, a magnetic strut channel fitting includes a substantially flat connecting plate, first and second arm members, each of the first and second arm members having a vertical plate and a horizontal plate, and a plurality of magnets, the plurality of magnets embedded into the connecting plate to allow the magnetic strut channel fitting to be magnetically adhere to a strut channel, wherein the first and second arm members connected and separated by the connecting plate such that a channel insert area is defined therebetween.

These and other aspects of the present invention will be better understood in view of the drawings and following detailed description.

DETAILED DESCRIPTION OF PREFERRED EMBODIMENTS

Figure 1:
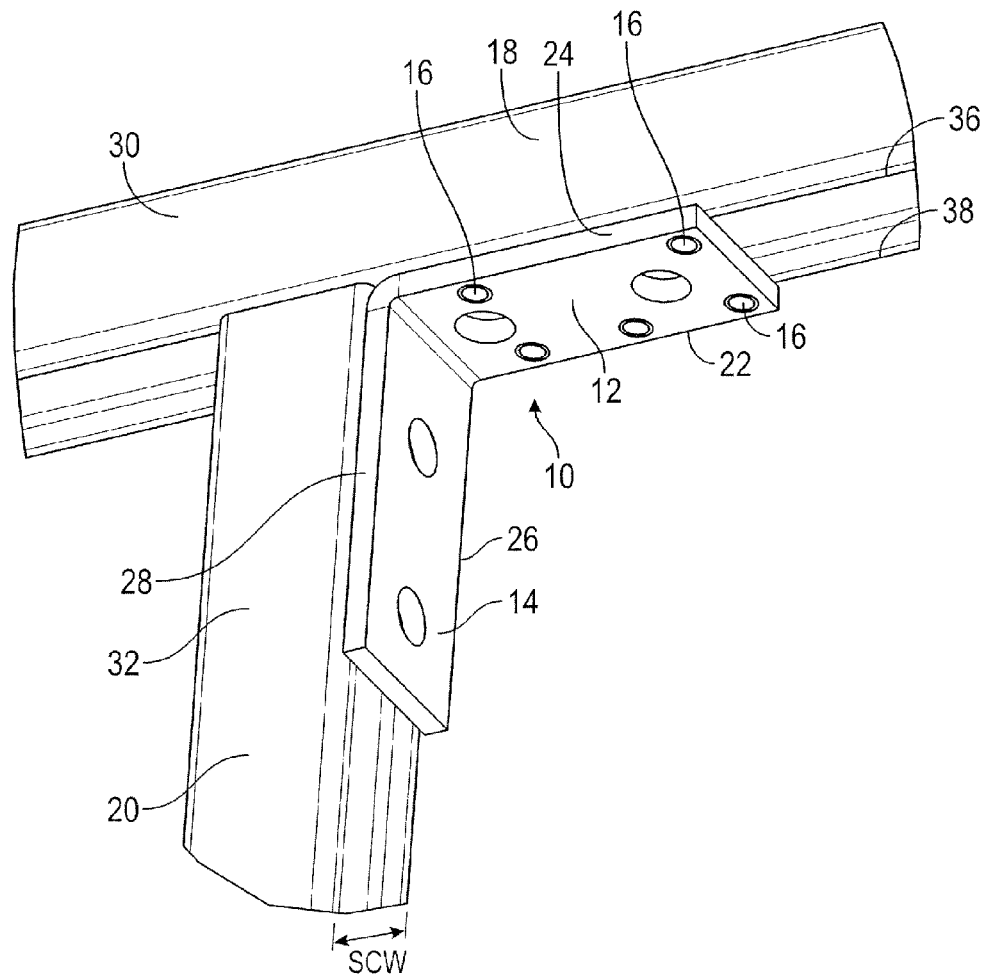
FIG. 1 is a perspective view of a magnetic strut channel fitting, according to an embodiment of the present invention, applied to multiple strut channels.

According to an embodiment of the present invention, referring to FIGS. 1-5, a magnetic strut channel fitting 10 includes a first plate 12, a second plate 14, and a plurality of magnets 16 embedded into at least one of the first and second plates 12, 14, as will be described in greater detail below. The magnetic strut channel fitting 10 is configured and adapted to be easily and conveniently mounted to strut channels 18, 20. More specifically, the plurality of magnets 16 allow the magnetic strut channel fitting 10 to magnetically adhere to the strut channel 18, as shown in FIG. 1, thereby, allowing an installer to freely use both hands during assembly to secure the magnetic strut channel fitting 10 to the strut channels 18, 20.

Referring again to FIGS. 1-5, the first and second plates 12, 14 are substantially flat and rectangular, and are connected to each other such that they are preferably perpendicular to each other. Alternatively, the first and second plates 12, 14 are connected such that an acute angle (e.g. 45 degrees) or an obtuse angle (e.g., 135 degrees) is formed between the plates 12, 14. In the depicted embodiment, the first and second plates 12, 14 are integrally connected to each other; alternately, the first and second plates 12, 14 could be welded thereto or attached via some other means. Preferably, first plate width FPW and second plate width SPW are equal to the width SCW of each of the strut channels 18, 20 such that, when the magnetic strut channel fitting 10 is mounted to the strut channels 18, 20, side edges 22, 24, 26, 28 of the first and second plates 12, 14 are flush with side walls 30, 32 of the strut channels 18, 20, as shown in FIG. 1. In addition, the length SPL of the second plate 14 is slightly greater than the length FPL of the first plate 12, although other configurations and dimensions are possible.

In the depicted embodiment, a plurality of magnet holes 34 are defined on the first plate 12, through which the plurality of magnets 16 are inserted and secured therewithin to allow the magnetic strut channel fitting 10 to be magnetically adhered to the strut channel 18 during assembly, as illustrated in FIG. 1. Specifically, the plurality of magnet holes 34 are positioned along each side portion of the first plate 12 such that the plurality of magnets 16 could be aligned and magnetically adhered to inturned members 36, 38 of the strut channel 18. Alternately, the plurality of magnet holes 34 could be defined on the second plate 14 or on both the first and second plates 12, 14.

Figure 2:
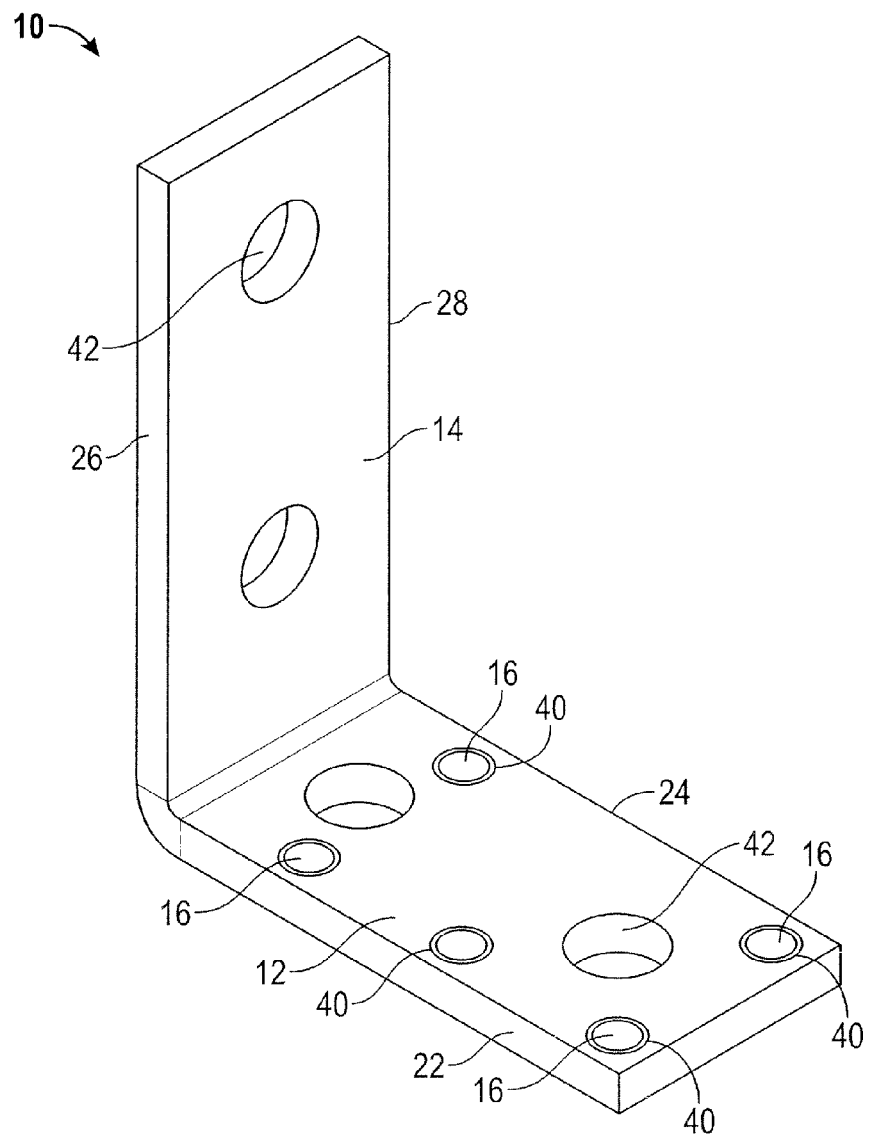
FIG. 2 is a perspective of the magnetic strut channel fitting in FIG. 1 with a plurality of magnets staked therein.
Figure 3:
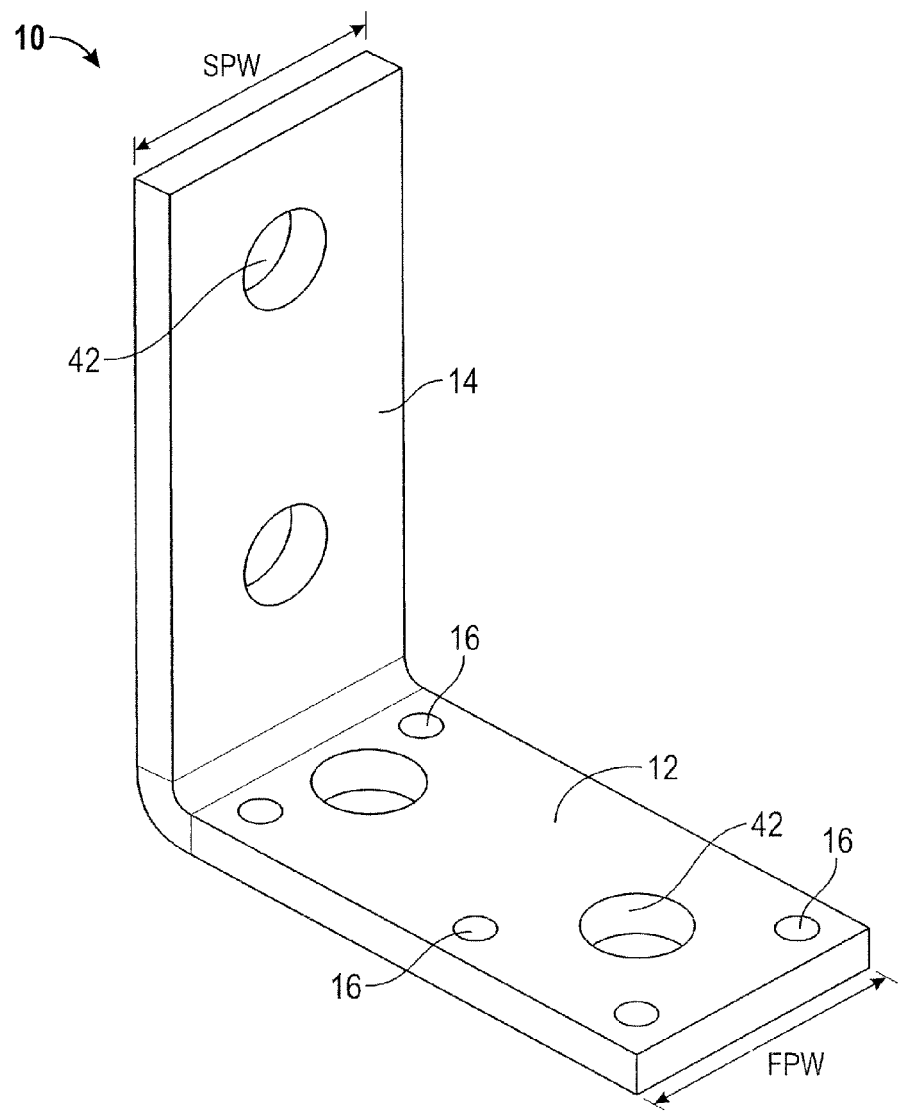
FIG. 3 is a perspective view of the magnetic strut channel fitting in FIG. 1 with a plurality of magnets embedded therein without staking.
Figure 4:
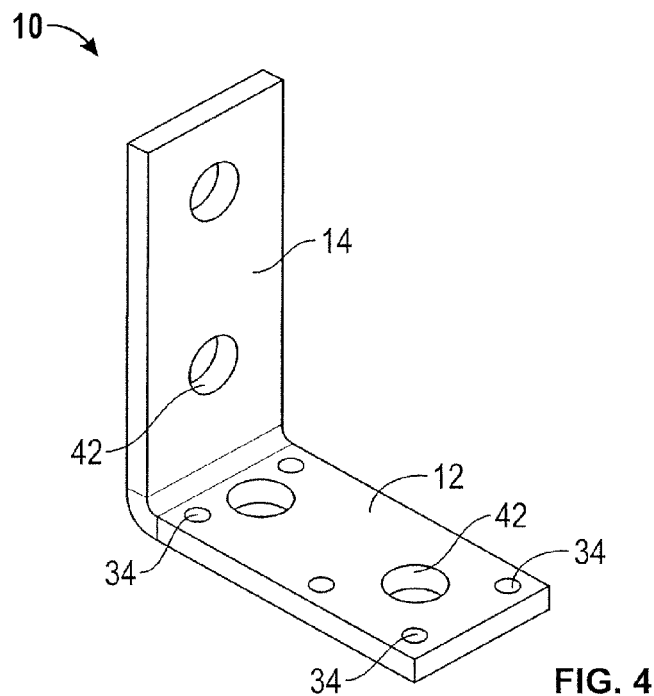
FIG. 4 is a perspective view of the magnetic strut channel fitting in FIG. 1 without a plurality of magnets embedded therein.
Figure 5:
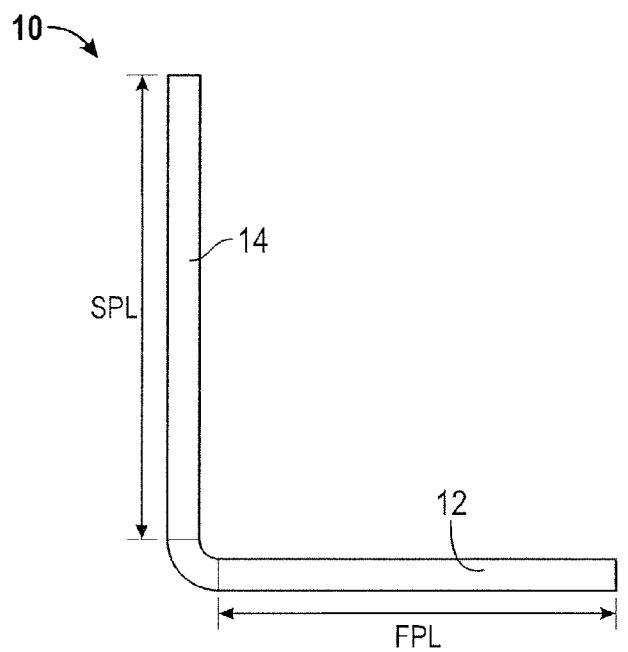
FIG. 5 is a side view of the magnetic strut channel fitting in FIG. 1.
Figure 6:
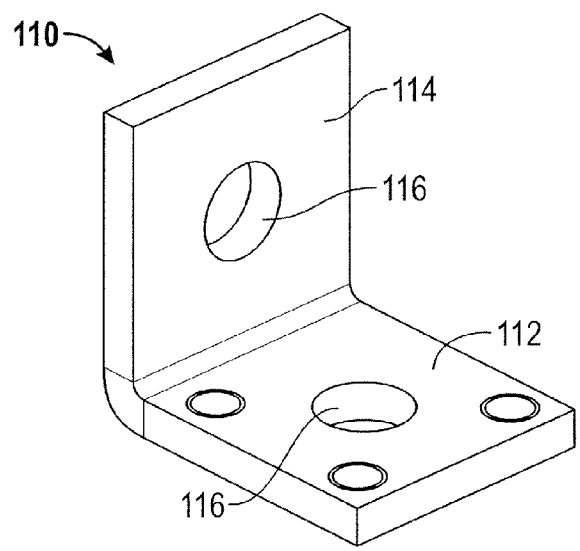
FIG. 6 is a perspective view of a magnetic strut channel fitting, according to another embodiment of the present invention, with a plurality of magnets staked therein.
Figure 7:
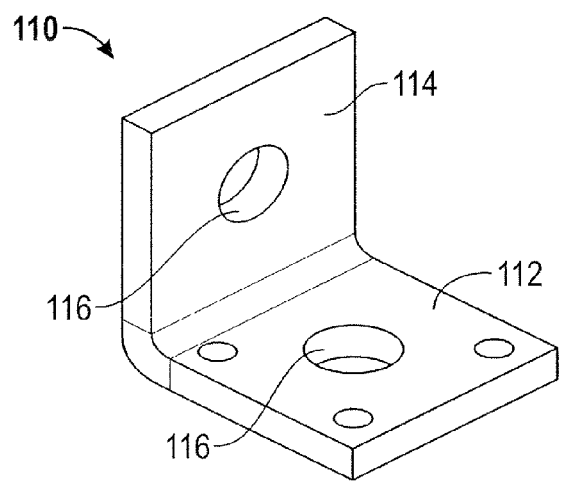
FIG. 7 is a perspective view of the magnetic strut channel fitting in FIG. 6 with a plurality of magnets embedded therein without staking.
Figure 8:
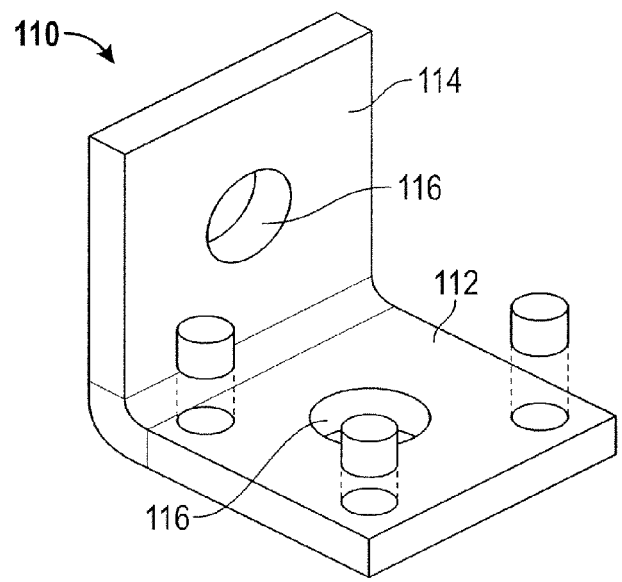
FIG. 8 is an exploded perspective view of the magnetic strut channel fitting in FIG. 7.
Figure 9:
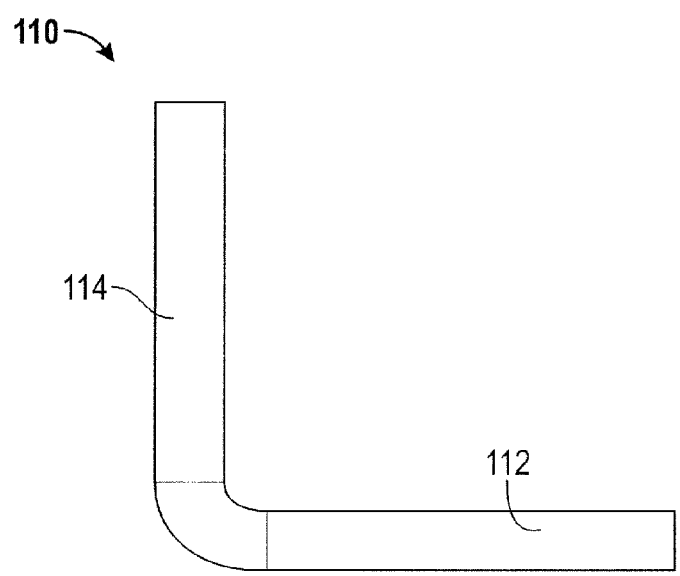
FIG. 9 is a side view of the magnetic strut channel fitting in FIG. 6.

Referring more particularly to FIG. 2, the plurality of magnets 16 are staked into the plurality of magnet holes 34. After the plurality of magnets 16 are installed into the plurality of magnet holes 34, the staking operation is performed to define a plurality of indents 40, with each indent 40 surrounding each corresponding magnet hole 34. Each of the plurality of indents 40 creates an interference fit between the first plate 12 and each of the plurality of magnets 16, thereby providing stability for each of the plurality of magnets 16. Alternately, the plurality of magnets 16 could be firmly secured within the plurality of magnet holes 34 by using an adhesive such as glue or some other means, as illustrated in FIG. 3. The plurality of magnets 16 are firmly embedded within the plurality of magnet holes 34 such that they do not move even a heavy axial load is applied thereon.

Each of the plurality of magnets 16 is dimensioned to be closely accommodated within each of the plurality of magnet holes 34. For example, the thickness of each of the plurality of magnets 16 is equal to the thickness of the first plate 12 such that each opposite end of each magnet 16 is flush with each surface of the first plate 12. This allows the magnetic strut channel fitting 10 to be installed in multiple orientations and also does not affect the interface between the magnetic strut channel fitting 10 and the strut channels 18, 20.

Referring again to FIGS. 1-5, each of the first and second plates 12, 14 includes a plurality of mounting holes 42, through which a fastener such as a bolt could be inserted and tightened with appropriate hardware to affix the magnetic strut channel fitting 10 to the strut channels 18, 20.

Preferred dimensions believed to be suitable for the magnetic strut channel fitting 10 include the first plate width FPW of approximately 1.625 inches, the second plate width SPW of approximately 1.625 inches, and the first and second plate lengths FPL, SPL of approximately 3.125 inches and 3.75 inches, respectively. The diameter of each of the plurality of magnets 16 and the diameter of each of the plurality of mounting holes 42 are preferably 0.25 inch and 0.56 inch, respectively.

Referring to FIGS. 6-9, in an alternate embodiment, a magnetic strut channel fitting 110 includes substantially flat first and second plates 112, 114, each having one mounting hole 116. In addition, the length of the first plate 112 is slightly greater than the length of the second plate 114, although other configurations and dimensions are possible.

Figure 10:
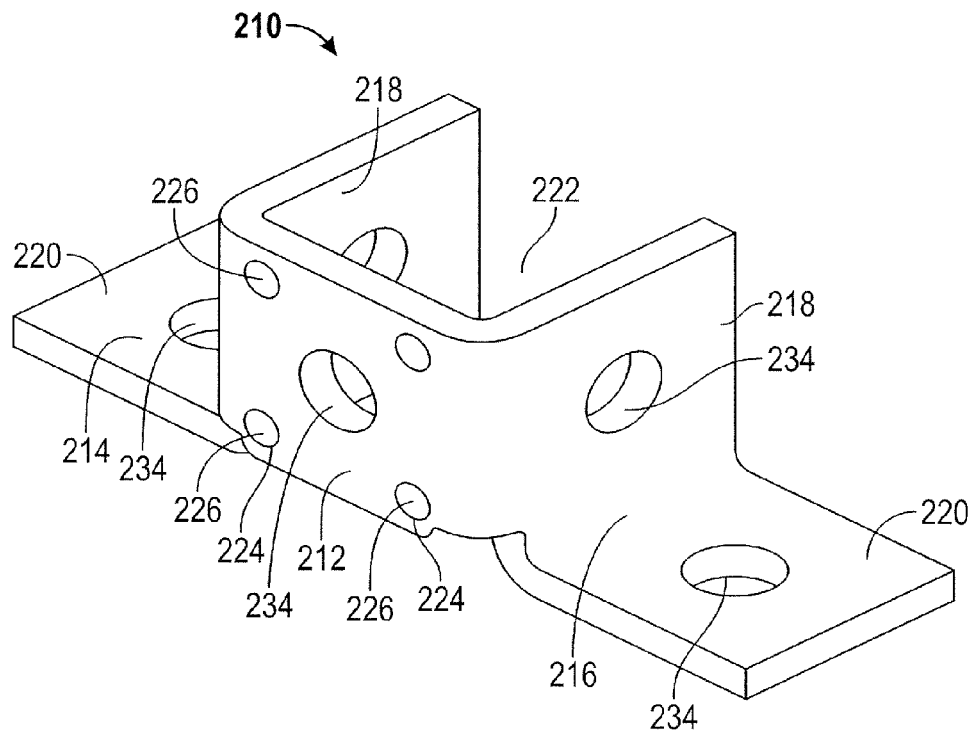
FIG. 10 is a perspective view of a magnetic strut channel fitting, according to another embodiment of the present invention, with a plurality of magnets embedded therein.
Figure 11:
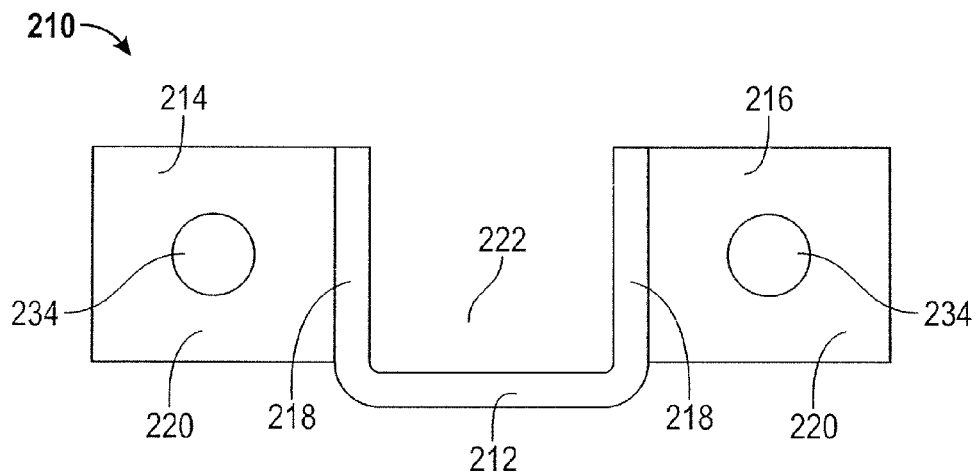
FIG. 11 is a top view of the magnetic strut channel fitting in FIG. 10.
Figure 12:
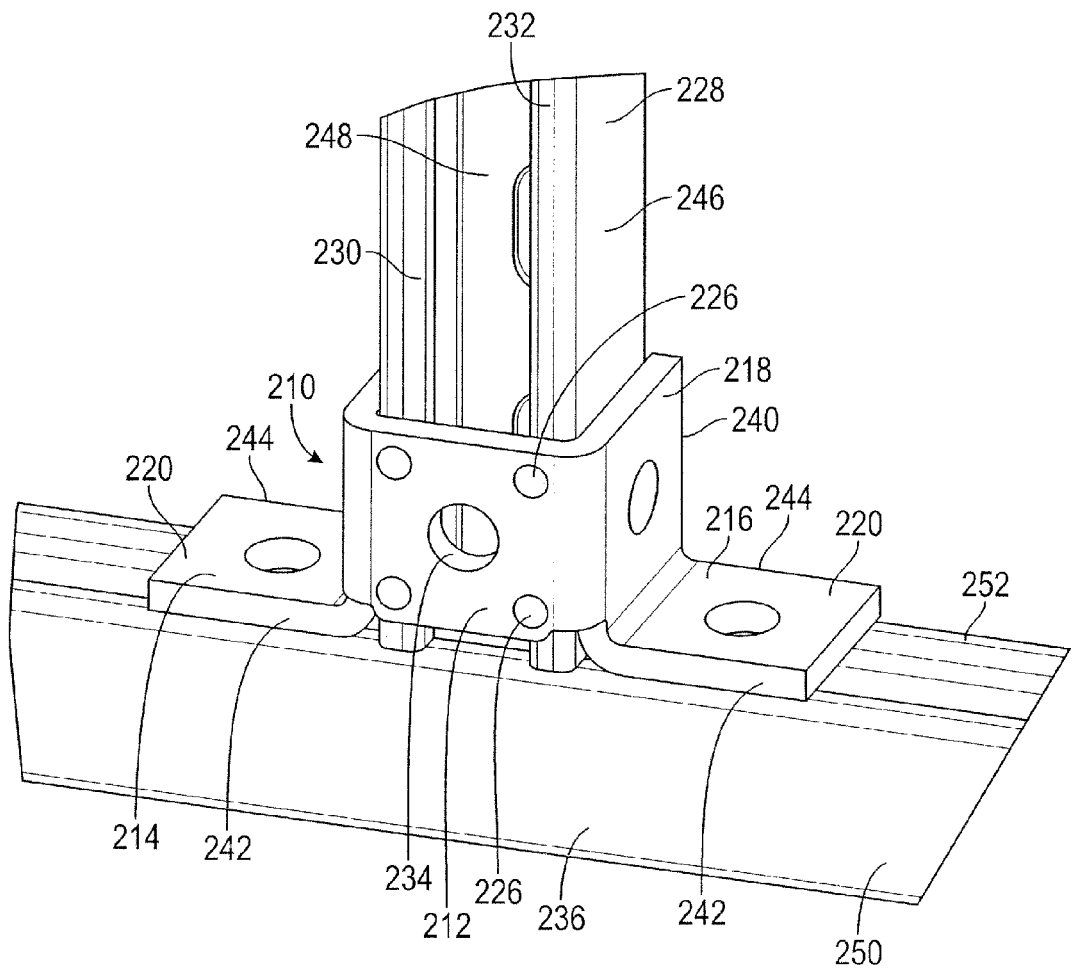
FIG. 12 is a perspective view of the magnetic strut channel fitting in FIG. 10, applied to strut channels.

Referring to FIGS. 10-12, in an alternate embodiment, a magnetic strut channel fitting 210 includes a substantially flat connecting plate 212, and L-shaped first and second arm members 214, 216, each having a vertical plate 218 and a horizontal plate 220. The first and second arm members 214, 216 are connected and separated by the connecting plate 212, defining a channel insert area 222 therebetween. A plurality of magnet holes 224 are defined on the connecting plate 212, through which a plurality of magnets 226 are inserted and secured therewithin to allow the magnetic strut channel fitting 210 to be magnetically adhered to a first strut channel 228 during assembly, as illustrated in FIG. 12. Specifically, the plurality of magnets 226 are positioned at each corner portion of the connecting plate 212 such that they could be aligned and magnetically adhered to inturned members 230, 232 of the first strut channel 228. A plurality of mounting holes 234 are defined on the first arm member 214, second arm member 216, and connecting plate 212, through which a fastener such as a bolt could be inserted and tightened with appropriate hardware to affix the magnetic strut channel fitting 210 to the strut channels 228, 236.

The magnetic strut channel fitting 210 is dimensioned such that a part of the first strut channel 228 could be closely accommodated within the channel insert area 222, as shown in FIG. 12. Once the magnetic strut channel fitting 210 is magnetically adhered to the first strut channel 228, a side edge 240 of the vertical plate 218 of each arm member 214, 216 and side edge 244 of the horizontal plate 220 of each arm member 214, 216 are flush with side walls 246, 248 of the first strut channel 228 and a side wall 252 of the second strut channel 236, respectively.

Figure 13:
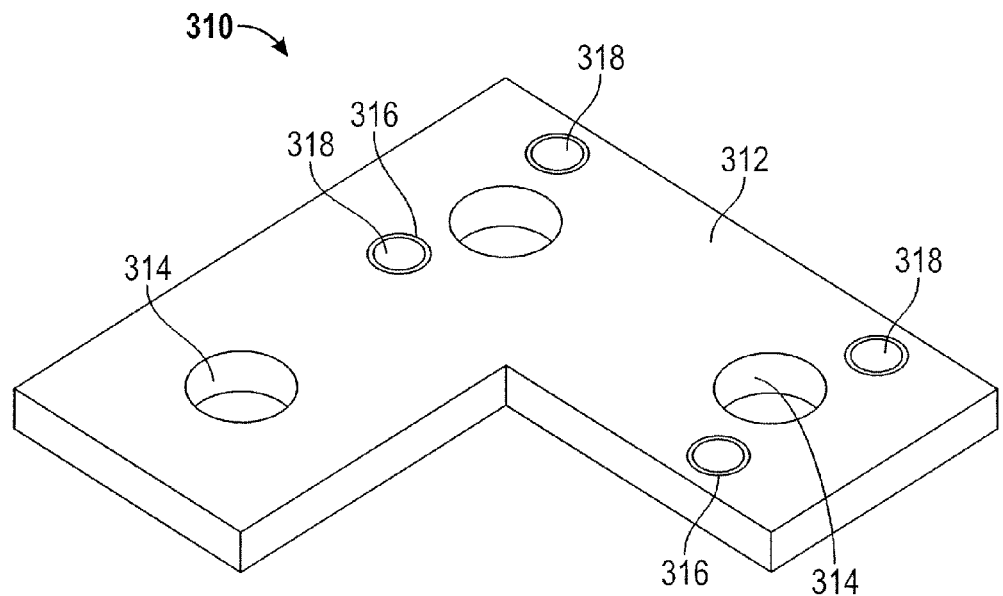
FIG. 13 is a perspective view of a magnetic strut channel fitting, according to another embodiment of the present invention, with a plurality of magnets staked therein.
Figure 14:
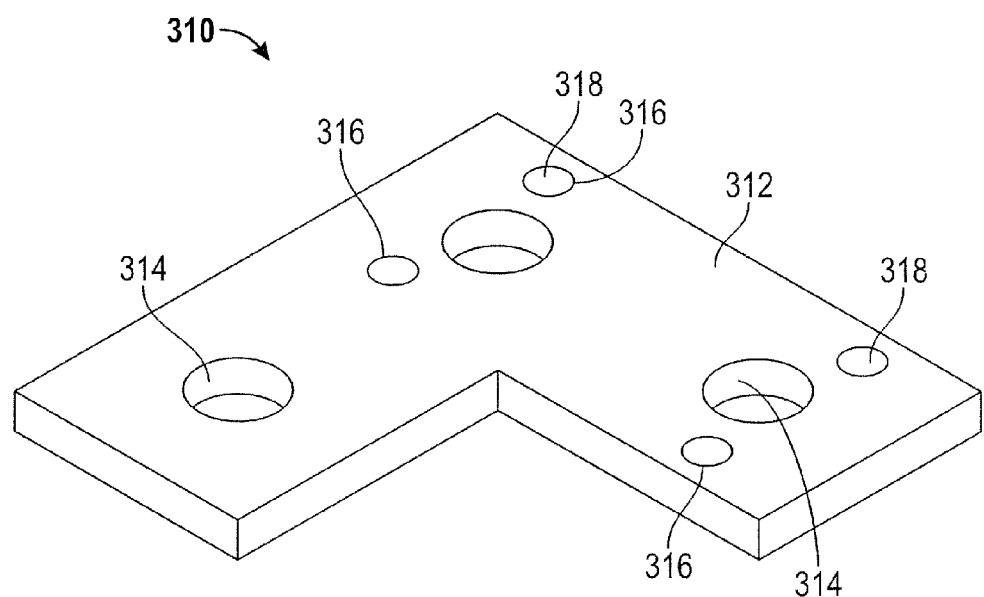
FIG. 14 is a perspective view of the magnetic strut channel fitting in FIG. 13 with a plurality of magnets embedded therein without staking.
Figure 15:
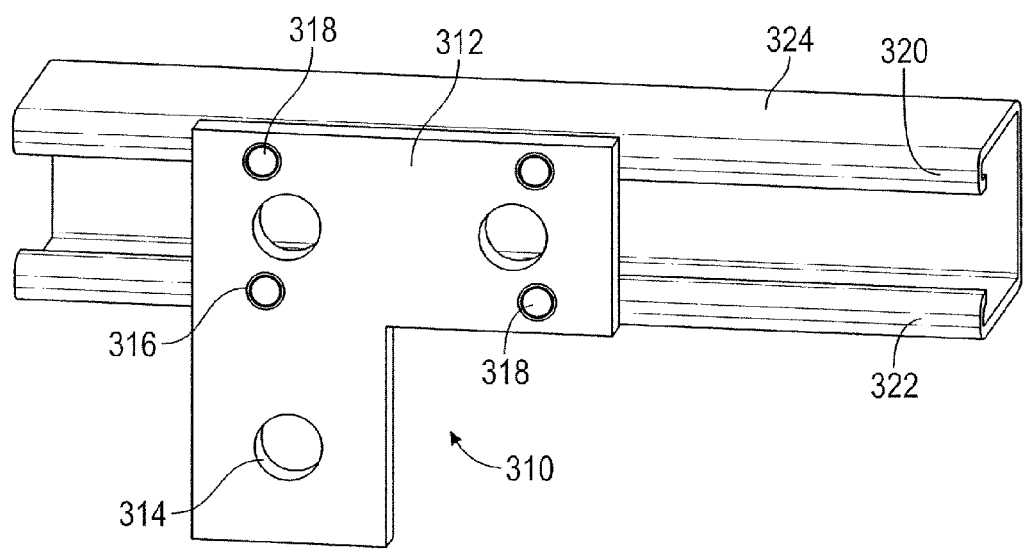
FIG. 15 is a perspective view of the magnetic strut channel fitting in FIG. 13, applied to a strut channel.
Figure 16:
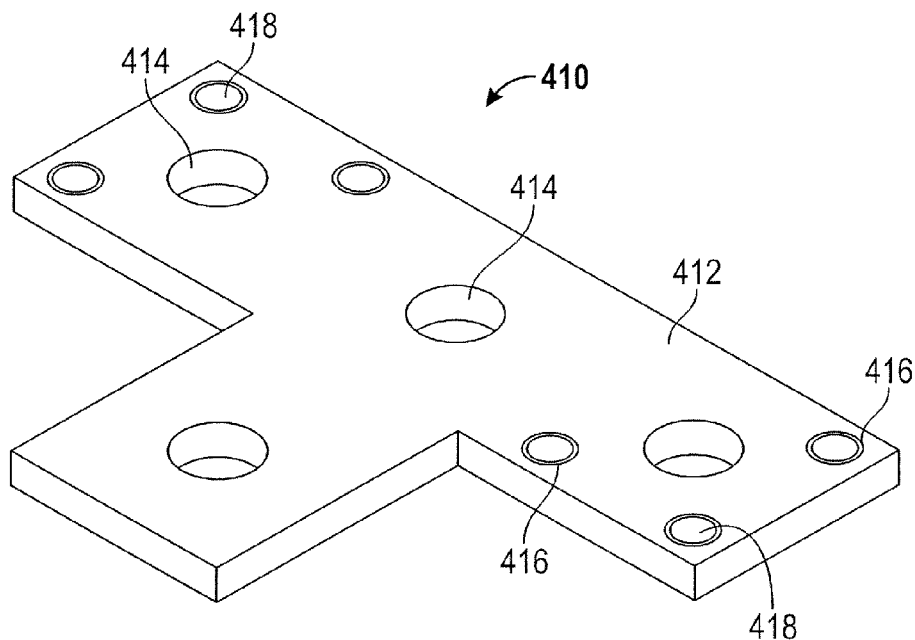
FIG. 16 is a perspective view of a magnetic strut channel fitting, according to another embodiment of the present invention, with a plurality of magnets staked therein.
Figure 17:
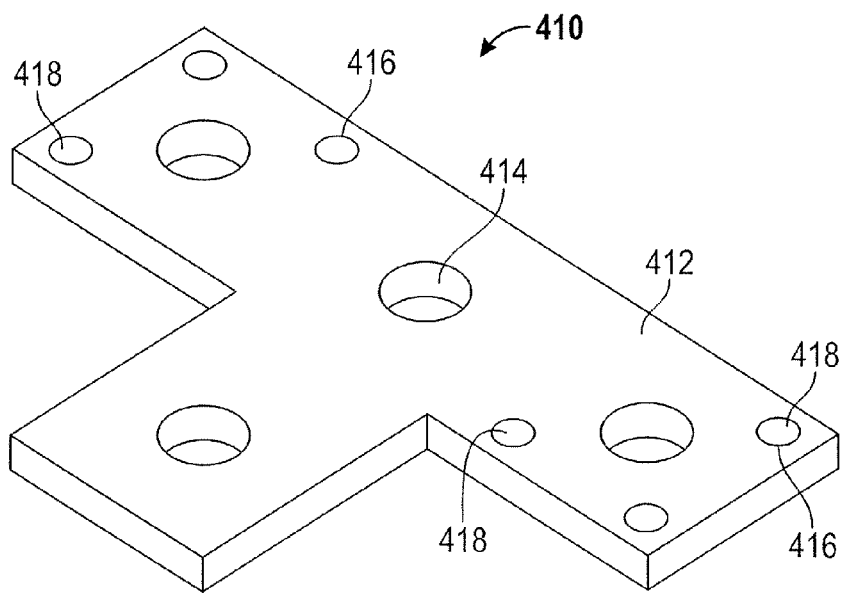
FIG. 17 is a perspective view of the magnetic strut channel fitting in FIG. 16 with a plurality of magnets embedded therein without staking.
Figure 18:
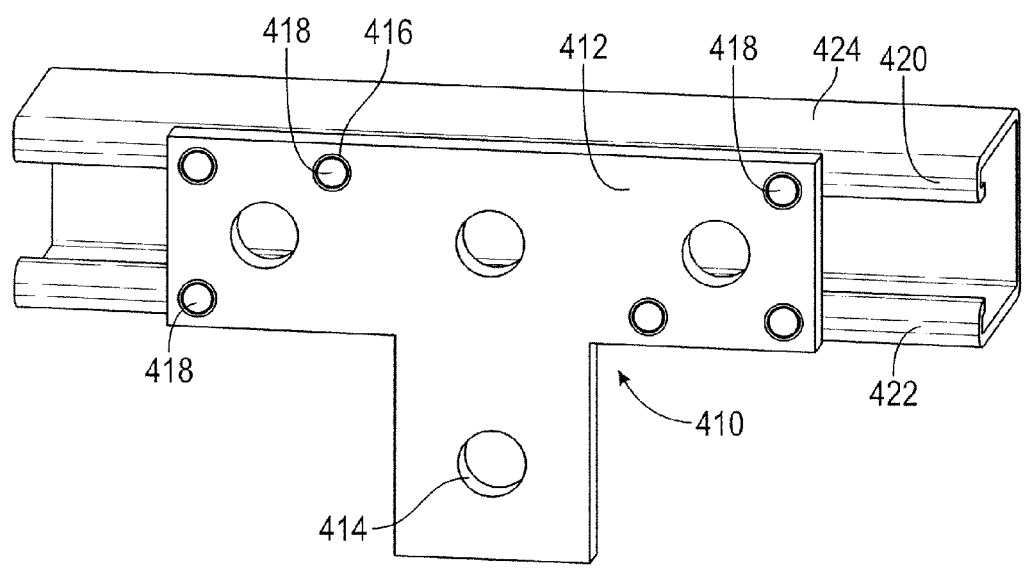
FIG. 18 is a perspective view of the magnetic strut channel fitting in FIG. 16, applied to a strut channel.
Figure 19:
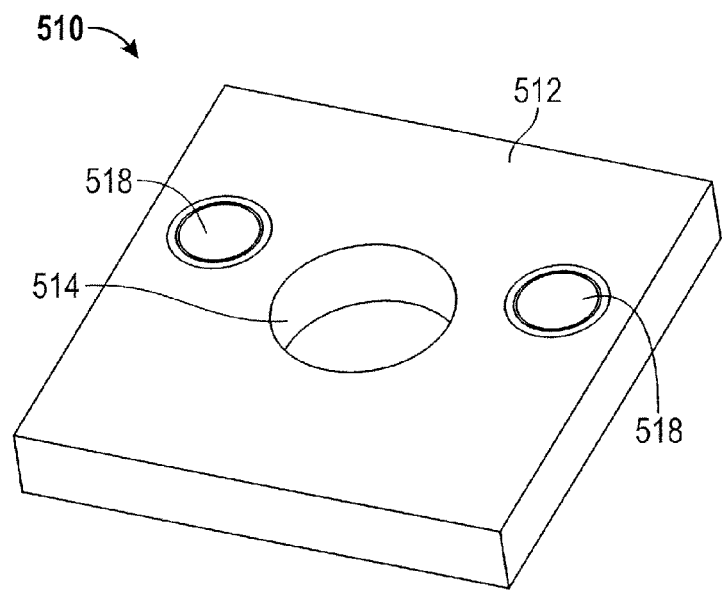
FIG. 19 is a perspective view of a magnetic strut channel fitting, according to another embodiment of the present invention, with a plurality of magnets staked therein.
Figure 20:
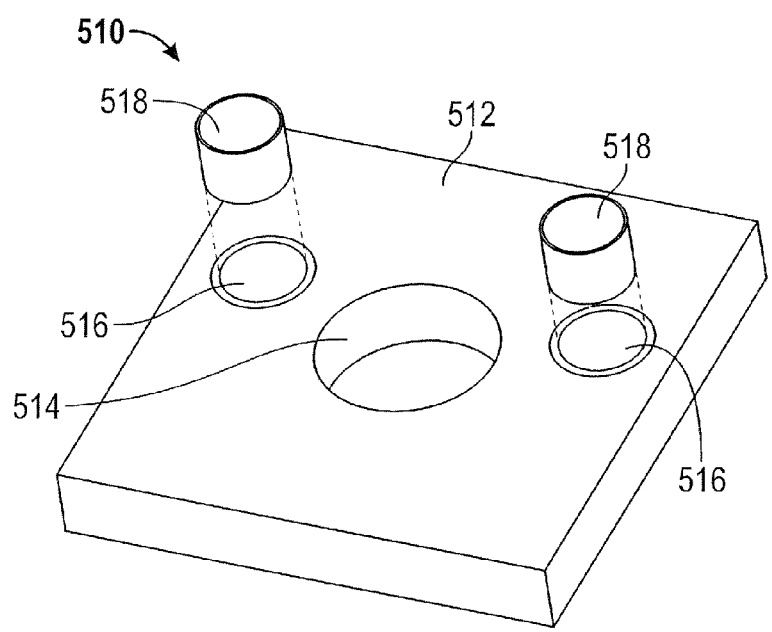
FIG. 20 is an exploded perspective view of the magnetic strut channel fitting in FIG. 19.
Figure 21:
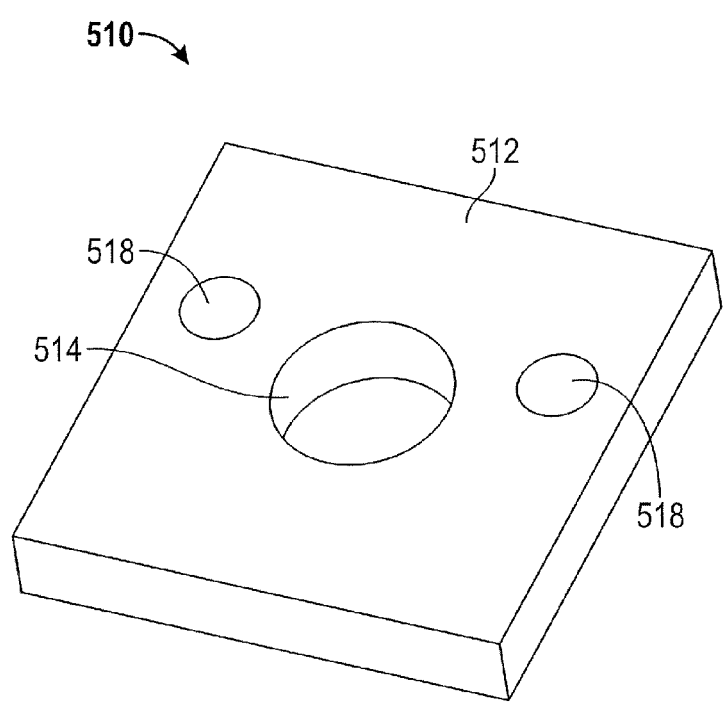
FIG. 21 is a perspective view of the magnetic strut channel fitting in FIG. 20 with a plurality of magnets embedded therein without staking.

It will be appreciated that other shapes, configurations and dimensions could be used for the magnetic strut channel fitting, as deemed suitable for a given application factors such as construction type. For example, in an alternate embodiment, referring to FIGS. 13-21, a magnetic strut channel fitting 310, 410, 510 is a substantially flat plate having a L shape (FIGS. 13-15) 312, a T shape (FIGS. 16-18) 412 or a square shape (FIGS. 19-21) 512. One or more mounting holes 314, 414, 514 and the plurality of magnet holes 316, 416, 516, with the plurality of magnets 318, 418, 518 embedded therewithin via staking (FIGS. 13, 16, and 19) or other suitable method (FIGS. 14, 17, and 21), are defined on the plates 312, 412, 512. The plurality of magnets 318, 418, 518 are configured and positioned such that they could be aligned and magnetically adhered to inturned members 320, 322, 420, 422 of a strut channel 324, 424, as illustrated in FIGS. 15 and 18. A fastener could be inserted and tightened through the mounting hole 314, 414, 514 to affix the magnetic strut channel fitting 310, 410, 510 to the strut channel 324, 424.

The thickness of each of the plurality of magnets 318, 418, 518 is equal to the thickness of the plate 312, 412, 512 such that, when the plurality of magnets 318, 418, 518 are embedded into the plurality of magnet holes 316, 416, 516, each opposite end of each of the plurality of magnets 316, 416, 516 is flush with each surface of the plate 312, 412, 512.

The magnetic strut channel fitting 10, 110, 210, 310, 410, 510 is made out of one or more materials having suitable properties for a desired application, including strength, weight, rigidity, etc. Preferably, the plurality of magnets 16, 226, 318, 418, 518 are rare earth disc magnets. Additionally, steel is generally preferred for the plates 12, 14, 112, 114, 212, 218, 220, 312, 412, 512. The magnetic strut channel fittings 10, 110, 210, 310, 410, 510 are formed as unitary pieces; for example by stamping from a single sheet of metal.

From the foregoing, it will be appreciated that a magnetic strut channel fitting according to the present invention magnetically adheres to a strut channel during assembly, thereby providing faster and easier installation of strut channels.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:

1. A magnetic strut channel fitting comprising:
   a first plate and a second plate, the first and second plates connected to each other, the first and second plates each having a first side edge and an opposing second side edge; and
   a plurality of magnets, the plurality of magnets embedded into either the first plate or the second plates to allow the magnetic strut channel fitting to be magnetically adhered to a first strut channel, a portion of the plurality of magnets positioned adjacent to one of the first side edge and the second edge, and another portion of the plurality of magnets positioned adjacent to the other of the first and second side edge such that the plurality of magnets could be aligned with, and magnetically adhered to, inturned members of the first strut channel;
   wherein each of the first plate and the second plate include one or more mounting holes, the one or more mounting holes of the first plate positioned to be adjacent to, and aligned with a position between the inturned members of, either the first strut channel or a second strut channel, and the one or more mounting holes of the second plate positioned to be adjacent to, and aligned with a position between the inturned members of, the other of the first strut channel and the second strut channel, the first and second strut channels being different strut channels.

2. The magnetic strut channel fitting of claim 1, wherein the first plate or the second plates define a plurality of magnet holes through which the plurality of magnets are inserted and secured therewithin.

3. The magnetic strut channel fitting of claim 2, wherein the plurality of magnet holes are positioned adjacent to each of the first and second side edges of the first plate or the second plates such that the plurality of magnets could be aligned and magnetically adhered to inturned members of the strut channel.

4. The magnetic strut channel fitting of claim 2, wherein a plurality of indents are defined such that each indent surrounds each corresponding magnet hole to stake the plurality of magnets into the plurality of magnet holes.

5. The magnetic strut channel fitting of claim 2, wherein the plurality of magnets are secured within the plurality of magnet holes by using an adhesive.

6. The magnetic strut channel fitting of claim 1, wherein a width between the first and second side edges of the first plate and a width between the first and second side edges of the second plate are equal.

7. The magnetic strut channel fitting of claim 6, wherein, when the magnetic strut channel fitting is mounted on the magnetic strut channel, side edges of the first and second plates are flush with side walls of the strut channel.

8. The magnetic strut channel fitting of claim 1, wherein each of the first and second plates defines one or more mounting holes, through which a fastener could be inserted and tightened to affix the magnetic strut channel fitting to the strut channel.

9. The magnetic strut channel fitting of claim 8, wherein the mounting holes of one of the first plate and the second plate are positioned to secure the magnetic strut channel fitting to a strut channel that is different than the strut channel to which the plurality of magnets are magnetically adhered.

10. The magnetic strut channel fitting of claim 1, wherein the first and second plates are perpendicular to each other.

11. The magnetic strut channel fitting of claim 1, wherein the first and second plates have substantially flat surfaces.

12. A magnetic strut channel fitting comprising:
    a first plate and a second plate, the first and second plates connected to each other; and
    a plurality of magnets, the plurality of magnets embedded into at least one of the first and second plates to allow the magnetic strut channel fitting to be magnetically adhered to a strut channel,
    wherein the at least one of the first and second plates define a plurality of magnet holes, through which the plurality of magnets are inserted and secured therewithin,
    wherein the thickness of each of the plurality of magnets is equal to the thickness of each of the first and second plates such that, when the plurality of magnets are embedded into the plurality of magnet holes of the at least one of the first and second plates, each opposite end of each of the plurality of magnets is flush with each surface of the at least one of the first and second plates.

13. The magnetic strut channel fitting of claim 12, wherein the first and second plates are connected such that a 45 degree angle or a 135 degree angle is formed between the first and second plates.

14. The magnetic strut channel fitting of claim 12, wherein the plurality of magnets are configured and positioned such that the plurality of magnets could be aligned and magnetically adhered to inturned members of the strut channel.

15. The magnetic strut channel fitting of claim 12, wherein the plate defines a plurality of magnet holes, through which the plurality of magnets are inserted and secured therewithin.

16. The magnetic strut channel fitting of claim 15, wherein a plurality of indents are defined such that each indent surrounds each corresponding magnet hole to stake the plurality of magnets into the plurality of magnet holes.

17. The magnetic strut channel fitting of claim 15, wherein the plurality of magnets are secured within the plurality of magnet holes by using an adhesive.

18. The magnetic strut channel fitting of claim 12, wherein one or more mounting holes are defined on the first plate and the second plate, through which a fastener could be inserted and tightened to affix the magnetic strut channel fitting to the strut channel.

19. A magnetic strut channel fitting comprising;
- a first plate and a second plate, the first and second plates connected to each other; and
- a plurality of magnets, the plurality of magnets embedded into either the first plate or the second plate to allow the magnetic strut channel fitting to be magnetically adhered to a first strut channel, and
- wherein each of the first plate and the second plate include one or more mounting holes, the one or more mounting holes of the first plate positioned to be adjacent to either the first strut channel or a second strut channel, and the one or more mounting holes of the second plate positioned to be adjacent to the other of the first strut channel and the second strut channel, the first and second strut channels being different strut channels
- wherein the plate defines a plurality of magnet holes, through which the plurality of magnets are inserted and secured therewithin, and
- wherein the thickness of each of the plurality of magnets is equal to the thickness of the plate such that, when the plurality of magnets are embedded into the plurality of magnet holes, each opposite end of each of the plurality of magnets is flush with each surface of the plate.

* * * * *